United States Patent
Podder et al.

(10) Patent No.: US 10,705,795 B2
(45) Date of Patent: Jul. 7, 2020

(54) DUPLICATE AND SIMILAR BUG REPORT DETECTION AND RETRIEVAL USING NEURAL NETWORKS

(71) Applicant: Accenture Global Solutions Limited, Dublin (IE)

(72) Inventors: Sanjay Podder, Thane (IN); Jayati Deshmukh, Bangalore (IN); Annervaz K M, Trichur (IN); Shubhashis Sengupta, Bangalore (IN); Neville Dubash, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 368 days.

(21) Appl. No.: 15/845,669

(22) Filed: Dec. 18, 2017

(65) Prior Publication Data
US 2018/0173495 A1     Jun. 21, 2018

(30) Foreign Application Priority Data

Dec. 19, 2016   (IN) .............................. 201641043292

(51) Int. Cl.
*G06F 7/02*       (2006.01)
*G06N 3/04*       (2006.01)
*G06F 11/00*      (2006.01)
*G06Q 10/06*      (2012.01)

(52) U.S. Cl.
CPC .............. *G06F 7/023* (2013.01); *G06F 11/00* (2013.01); *G06N 3/04* (2013.01); *G06N 3/0445* (2013.01); *G06N 3/0454* (2013.01); *G06Q 10/06* (2013.01); *G06F 2207/4824* (2013.01)

(58) Field of Classification Search
CPC ....................................................... G06F 11/362
USPC .......................................................... 707/692
See application file for complete search history.

(56) References Cited

U.S. PATENT DOCUMENTS

| | | | |
|---|---|---|---|
| 2008/0222065 A1 | 11/2008 | Kedrowski et al. | |
| 2013/0014084 A1* | 1/2013 | Sahibzada ............. | G06F 11/368 717/124 |
| 2016/0292062 A1* | 10/2016 | Bommaraju .......... | G06F 11/362 |

OTHER PUBLICATIONS

Bugzilla, www.bugzilla.org, May 26, 2016, 2 pages.
Mozilla Thunderbird, www.mozilla.org/en-US/thunderbird, Jun. 28, 2011, 1 page.
(Continued)

*Primary Examiner* — Baoquoc N To
(74) *Attorney, Agent, or Firm* — Harrity & Harrity, LLP

(57) ABSTRACT

A device may receive information associated with first and second bug reports to be classified as duplicate or non-duplicate bug reports. The device may identify first and second descriptions associated with the first and second bug reports, respectively. The first and second descriptions may be different descriptions having a shared description type. The device may identify a neural network for encoding the first and second descriptions, based on the shared description type. The device may encode the first description into a first vector using the neural network, and may encode the second description into a second vector using the neural network. The device may classify the first and second bug reports as duplicate or non-duplicate bug reports based on the first vector and the second vector. The device may perform an action based on classifying the first and second bug reports as duplicate or non-duplicate bug reports.

20 Claims, 5 Drawing Sheets

(56) References Cited

OTHER PUBLICATIONS

Wikipedia, "Word embedding", https://en.wikipedia.org/wiki/Word_embedding, Dec. 16, 2017, 4 pages.
Wikipedia, "Long short-term memory", https://en.wikipedia.org/wiki/Long_short-term_memory, Dec. 6, 2017, 7 pages.
Wikipedia, "Convolutional neural network", https://en.wikipedia.org/wiki/Convolutional_neural_network, Dec. 19, 2017 14 pages.
Wikipedia, "Margin classifier", https://en.wikipedia.org/wiki/Margin_classifier, Sep. 6, 2017, 2 pages.
Boehm et al., "Software Defect Reduction Top 10 List", https://www.cs.umd.edu/projects/SoftEng/ESEG/papers/82.78.pdf, Jan. 2001, 3 pages.
Cavalcanti et al., "An Initial Study on the Bug Report Duplication Problem", 2010 14th European Conference on Software Maintenance and Reengineering, IEE Computer Society, 2010, 4 pages.
Le et al., "Distributed Representations of Sentences and Documents", Proceedings of the 31st International Conference on Machine Learning, Beijing, China, 2014, https://cs.stanford.edu/~quocle/paragraph_vector.pdf, 9 pages.
Pascanu et al., "On the difficulty of training recurrent neural networks", Proceedings of the 30th International Conference on Machine Learning, Atlanta, Georgia, USA, 2013, 9 pages.
Pennington et al., "GloVe: Global Vectors for Word Representation", https://nlp.stanford.edu/pubs/glove.pdf, 2014, 12 pages.
Tai et al., "Improved Semantic Representations From Tree-Structured Long Short-Term Memory Networks", https://aclweb.org/anthology/P/P15/P15-1150.pdf, Jul. 26-31, 2015, 11 pages.
Tan et al., "LSTM-Based Deep Learning Models for Nonfactoid Answer Selection", IBM Watson Core Technologies, 2016, 11 pages.
Xu et al., "Show, Attend and Tell: Neural Image Caption Generation with Visual Attention", http://proceedings.mlr.press/v37/xuc15.pdf, 2015, 10 pages.
Kemp, T. C., "Automated Detection of Duplicate Free-Form English Bug Reports", Master of Science Report, West Virginia University, 2009 [online], [retrieved from internet on May 10, 2018], 35 pages.
Harley, A. W. et al., "Evaluation of Deep Convolutional Nets for Document Image Classification and Retrieval", 13th International Conference on Document Analysis and Recognition (ICDAR), Aug. 23, 2015, pp. 991-995.

\* cited by examiner

DUPLICATE AND SIMILAR BUG REPORT DETECTION AND RETRIEVAL USING NEURAL NETWORKS

RELATED APPLICATION

This application claims priority under 35 U.S.C. § 119 to Indian Patent Application No. 201641043292, filed on Dec. 19, 2016, the content of which is incorporated by reference herein in its entirety.

BACKGROUND

A neural network may employ a computational approach based on a large collection of neural units that loosely model the way a biological brain solves problems, with large clusters of biological neurons connected by axons. Rather than being explicitly programmed, neural networks are self-learning and may be trained. As a result, neural networks may excel in areas where a solution is difficult to express in a traditional computer program.

SUMMARY

A device may include one or more processors to receive information associated with a first bug report and a second bug report to be classified as duplicate bug reports or non-duplicate bug reports. The one or more processors may identify a first description, associated with the first bug report, and a second description associated with the second bug report. The first description and the second description may be different descriptions having a shared description type. The one or more processors may identify a neural network, of a plurality of different types of neural networks, for encoding the first description and the second description, based on the shared description type. The one or more processors may encode the first description into a first vector using the neural network. The one or more processors may encode the second description into a second vector using the neural network. The one or more processors may classify the first bug report and the second bug report as duplicate bug reports or non-duplicate bug reports based on the first vector and the second vector. The one or more processors may perform an action based on classifying the first bug report and the second bug report as duplicate bug reports or non-duplicate bug reports.

A method may include receiving, by a device, information associated with a first entity and a second entity to be classified as duplicate entities or non-duplicate entities. The method may include identifying, by the device, a first set of descriptions, associated with the first entity, and a second set of descriptions associated with the second entity. Each description, included in the first set of descriptions, may share a description type with a corresponding description included in the second set of descriptions. The method may include encoding, by the device, the first set of description into a first set of vectors using a corresponding set of neural networks. Each neural network, of the corresponding set of neural networks, may operate on a different description type. The method may include encoding, by the device, the second set of descriptions into a second set of vectors using the corresponding set of neural networks. The method may include classifying, by the device, the first entity and the second entity as duplicate entities or non-duplicate entities based on the first set of vectors and the second set of vectors. The method may include performing, by the device, an action based on classifying the first entity and the second entity as duplicate entities or non-duplicate entities.

A non-transitory computer-readable medium may store one or more instructions that, when executed by one or more processors, cause the one or more processors to receive information associated with a first entity and a second entity to be classified as duplicate entities or non-duplicate entities. The one or more instructions may cause the one or more processors to identify a first description associated with the first entity and a second description associated with the second entity. The first description and the second description may have a first description type. The one or more instructions may cause the one or more processors to identify a third description associated with the first entity and a fourth description associated with the second entity. The third description and the fourth description may have a second description type that is different from the first description type. The third description may be different from the first description, and the fourth description may be different from the second description. The one or more instructions may cause the one or more processors to encode the first description into a first vector using a first neural network. The one or more instructions may cause the one or more processors to encode the second description into a second vector using the first neural network. The one or more instructions may cause the one or more processors to encode the third description into a third vector using a second neural network. The one or more instructions may cause the one or more processors to encode the fourth description into a fourth vector using the second neural network. The one or more instructions may cause the one or more processors to classify the first entity and the second entity as duplicate entities or non-duplicate entities based on the first vector, the second vector, the third vector, and the fourth vector. The one or more instructions may cause the one or more processors to perform an action based on classifying the first entity and the second entity as duplicate entities or non-duplicate entities.

DETAILED DESCRIPTION

Figure 1:
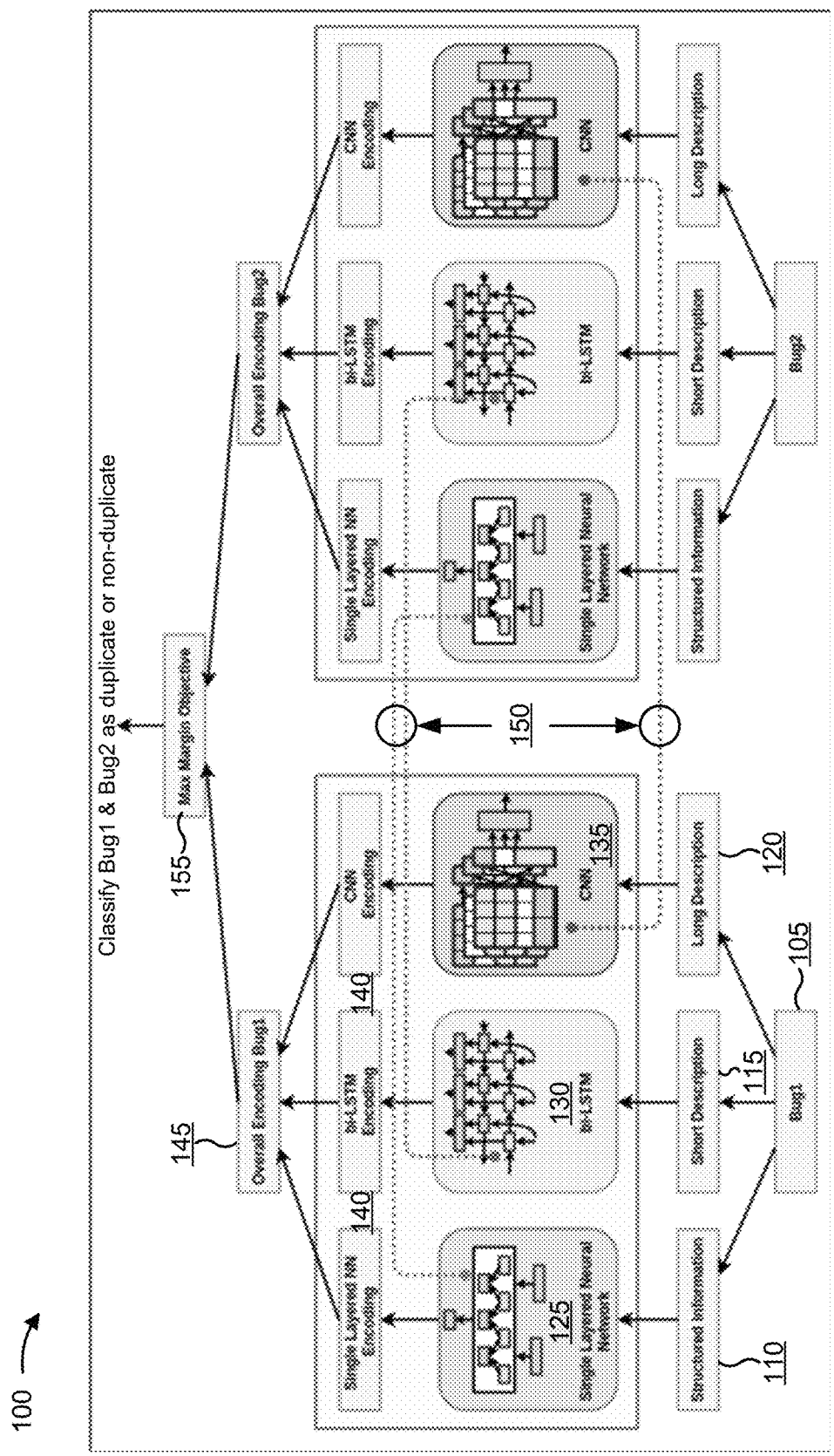
FIG. 1 is a diagram of an overview of an example implementation described herein.

The following detailed description of example implementations refers to the accompanying drawings. The same reference numbers in different drawings may identify the same or similar elements.

Duplicate bug report detection may refer to determining whether two or more reported bugs (e.g., software bugs, hardware bugs, product bugs, system bugs, etc.) identify the same issue. Such duplicate bugs may be retrieved to assist with software development. As used herein, "duplicate" may refer to sharing a threshold degree of similarity (e.g., a duplicate bug report may refer to an exact duplicate bug report or a similar bug report). For example, duplicate bug report detection may be used to determine whether a newly reported bug identifies the same issue or a similar issue as a previously reported bug. In a typical software development project, there may be hundreds, thousands, or more duplicate bug reports. Without the ability to accurately detect duplicate bug reports, software developers and/or software testers may waste hundreds or thousands of hours performing costly rework, and may waste computing resources used for that rework. Retrieval of duplicate or similar bug reports may help to identify solutions from previous fixes.

In some cases, machine learning may be used to assist with duplicate bug report detection. For example, a neural network may be trained using known duplicate and non-duplicate bug reports. The neural network may then receive a bug report as input, and may determine whether the bug report and one or more other bug reports are duplicates (e.g. sharing a threshold degree of similarity) or non-duplicates (e.g., sharing a threshold degree of dissimilarity). However, some models may need to receive the bug report according to a particular structured data format to accurately perform duplicate bug report detection. This may decrease the accuracy of duplicate bug report detection or may render these models useless for duplicate bug report detection if the bug report is not formatted according to the particular structured data format.

Implementations described herein use machine learning to perform duplicate bug report detection and retrieval regardless of whether the bug reports are formatted according to a particular structured data format. For example, these implementations may use natural language processing to process free-form text, and may operate on the free-form text to perform duplicate bug report detection. In this way, implementations described herein may be used without formatting bug reports, thereby conserving resources (e.g., computing resources, time, and money) that would otherwise be used to format bug reports in a particular manner, and also increasing the applicability of duplicate bug report detection to a greater number of scenarios (e.g., more software projects).

Furthermore, implementations described herein may configure a machine learning model for duplicate bug report detection and retrieval based on a type of description associated with the bug report. For example, a first neural network may be used to process short descriptions included in bug reports, a second neural network may be used to process long descriptions included in bug reports, a third neural network may be used to process structured data descriptions included in bug reports, and/or the like. Because different types of neural networks may be better suited to process different kinds of data, employing different types of neural networks to process different types of descriptions may thereby improve the accuracy of duplicate bug report detection.

Finally, implementations described herein may permit training of a machine learning model to be applied to a first project using training data from a second project (e.g., in a same domain as the first project). In this way, the machine learning model may be applied to a project even if training data for that project is limited or does not exist, thereby increasing the applicability of duplicate bug report detection to a greater number of projects.

While implementations described herein focus on bug reports, these implementations may be used for any scenario that involves detecting whether two or more entities are duplicate entities (e.g., sharing threshold degree of similarity) or non-duplicate entities. For example, such entities may include bug reports, user reviews (e.g., product reviews, service reviews, etc.), problem tickets, customer complaints, documents, claims (e.g., insurance claims, medical claims, etc.), and/or the like.

FIG. 1 is a diagram of an overview of an example implementation 100 described herein. FIG. 1 shows an example of a machine learning model for duplicate bug report detection. The machine learning model may include one or more neural networks, such as a single-layer neural network, a long short-term memory (LSTM) neural network (e.g., specifically, a bi-directional LSTM neural network), a convolutional neural network (CNN), and/or the like. In example implementation 100, the single-layer neural network may process structured data descriptions associated with bug reports, the bi-LSTM neural network may process short descriptions associated with bug reports, and the convolutional neural network may process long descriptions associated with bug reports. These different types of neural networks may be better suited to process bug reports with these corresponding description types, thereby improving the accuracy of duplicate bug report detection. The machine learning model may use natural language processing to understand a natural language description to determine a neural network to be used to process the natural language description, as described below.

As shown by reference number 105, the machine learning model may receive a first bug report (shown as "Bug1") as input. The first bug report may include, for example, a structured data description (as shown by reference number 110), a short description (as shown by reference number 115), and/or a long description (as shown by reference number 120). A structured data description may include text that is tagged with an identifier (e.g., based on one or more fields used for textual input to report a bug) and/or text that is formatted according to a particular data format (e.g., an Extensible Markup Language (XML) format, a JavaScript Object Notation (JSON) format, etc.). A short description may include text (e.g., free-form text) with a length that is less than (or less than or equal to) a threshold (e.g., a threshold quantity of words, characters, lines, etc.). For example, a short description may include one or two sentences. A long description may include text (e.g., free-form text) with a length that is greater than (or greater than or equal to) a threshold. For example, a long description may include more than two sentences.

As further shown in FIG. 1, the single-layer neural network may process the structured data description (as shown by reference number 125), the bi-LSTM neural network may process the short description (as shown by reference number 130), and the convolutional neural network may process the long description (as shown by reference number 135). For example, the descriptions may be pre-processed to create corresponding high dimensional vectors, and the high dimensional vectors may be input to the corresponding neural networks. The neural networks may process the high dimensional vectors, formed by replacing words in a description with corresponding encodings, to encode the descriptions to corresponding low dimensional vectors using dimensionality reduction (e.g., feature selection, feature extraction, etc.), as shown by reference number 140. As shown by reference number 145, the machine learning model may combine the low dimensional vectors (e.g., using concatenation) into an overall vector for the first bug report.

As shown by reference number 150, the machine learning model may perform a similar process for a second bug report (shown as "Bug2") to generate an overall vector for the second bug report. In some implementations, when processing the second bug report, the machine learning model may use the same single-layer neural network, the same bi-LSTM neural network, and/or the same convolutional neural network that was used to process the first bug report, thereby producing a comparable output that can be used for duplicate bug report detection.

As shown by reference number 155, the machine learning model may classify the first bug report and the second bug report as duplicate bug reports (e.g., having a degree of similarity that satisfies a threshold) or non-duplicate bug reports (e.g., having a degree of similarity that does not satisfy the threshold). For example, the machine learning model may be trained using a maximum margin objective to classify the first bug report and the second bug report (e.g., as duplicates, as sharing a threshold degree of similarity, as non-duplicates, etc.), as described in more detail elsewhere herein.

In this way, the machine learning model may more accurately classify bug reports as duplicate or non-duplicate by configuring the machine learning model to the type of descriptions available for bug reports (e.g., by using different types of neural networks for different description types). While the machine learning model shown in FIG. 1 uses three different types of neural networks, the machine learning model may use fewer neural networks, additional neural networks, and/or different neural networks than those shown. For example, the machine learning model may not use a single-layer neural network to process structured data descriptions, in some implementations. In this way, the machine learning model may operate on free-form text that does not require structured formatting, thereby conserving computing resources that would otherwise be used to format bug reports in a particular manner, and also increasing the applicability of duplicate bug report detection to a greater number of scenarios. Furthermore, while the machine learning model is shown in FIG. 1 as comparing two bug reports, the machine learning model may be used to compare more than two bug reports, in some implementations.

As indicated above, FIG. 1 is provided merely as an example. Other examples are possible and may differ from what was described with regard to FIG. 1.

Figure 2:
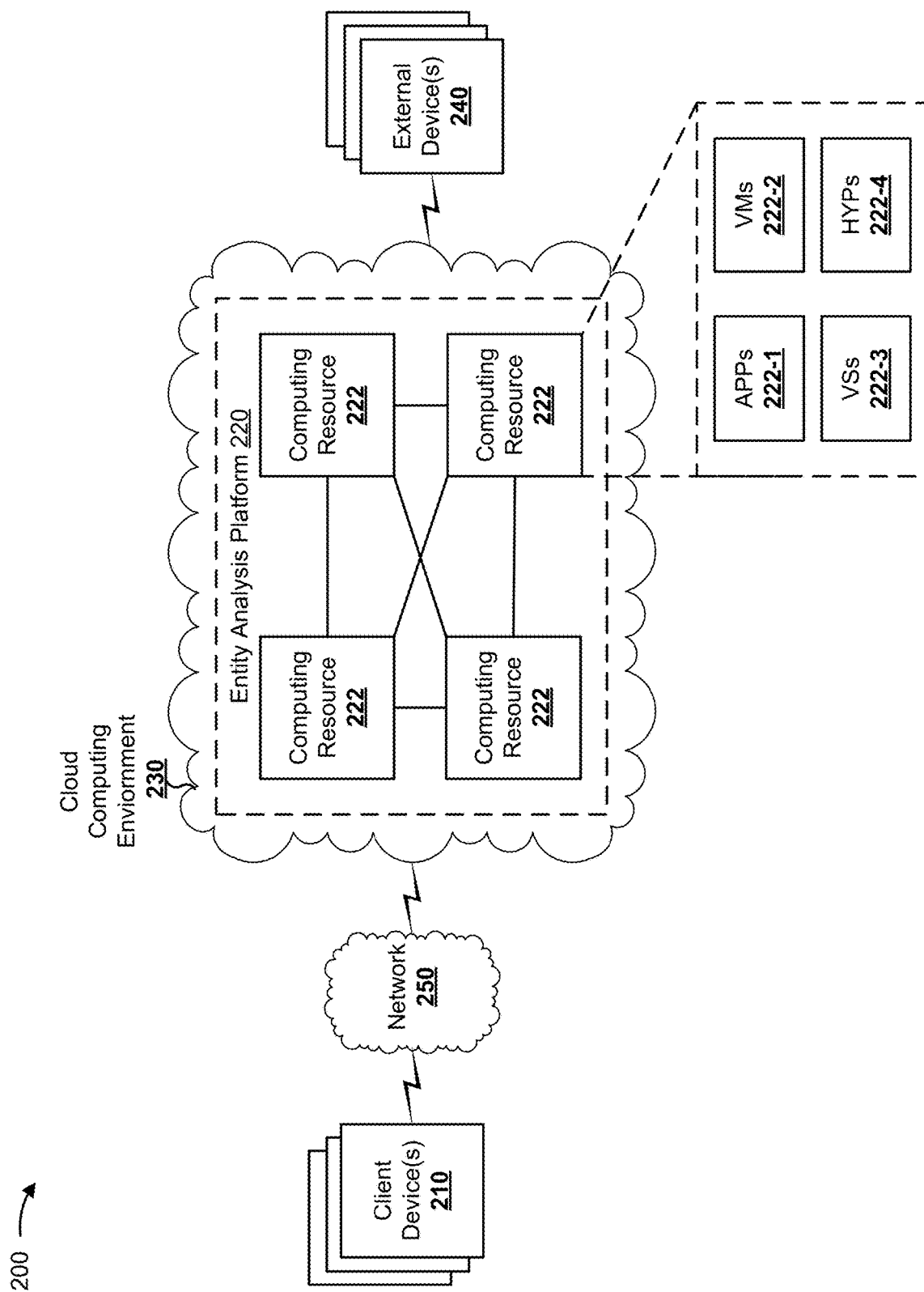
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of client devices 210, an entity analysis platform 220, a cloud computing environment 230, a set of external devices 240, and a network 250. Devices of environment 200 may interconnect via wired connections, wireless connections, or a combination of wired and wireless connections.

Client device 210 includes one or more devices capable of receiving, generating, storing, processing, and/or providing information associated with an entity classification analysis. For example, client device 210 may include a communication and/or computing device, such as a desktop computer, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Client device 210 may be used to access entity analysis platform 220, to provide information to entity analysis platform 220, and/or to receive information from entity analysis platform 220.

Entity analysis platform 220 includes one or more devices capable of receiving, generating, storing, processing, updating, and/or providing information associated with classifying entities as duplicates or non-duplicates. For example, entity analysis platform 220 may include a cloud server or a group of cloud servers.

In some implementations, as shown, entity analysis platform 220 may be hosted in cloud computing environment 230. Notably, while implementations described herein describe entity analysis platform 220 as being hosted in cloud computing environment 230, in some implementations, entity analysis platform 220 may not be cloud-based (i.e., may be implemented outside of a cloud computing environment) or may be partially cloud-based.

Cloud computing environment 230 includes an environment that hosts entity analysis platform 220. Cloud computing environment 230 may provide computation, software, data access, storage, and/or other services that do not require end-user knowledge of a physical location and configuration of system(s) and/or device(s) that host entity analysis platform 220. As shown, cloud computing environment 230 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host entity analysis platform 220. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, virtualized storage ("VSs") 222-3, one or more hypervisors ("HYPs") 222-4, and/or the like.

Application 222-1 includes one or more software applications that may be provided to or accessed by client device 210. Application 222-1 may eliminate a need to install and execute the software applications on client device 210. For example, application 222-1 may include software associated with entity analysis platform 220 and/or any other software capable of being provided via cloud computing environment 230. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., client device 210), and may manage infrastructure of cloud computing environment 230, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

External device 240 includes one or more devices capable of providing information to entity analysis platform 220 to assist with classifying entities as duplicates or non-duplicates. For example, external device 240 may include a server, such as a web server or a database server. In some implementations, external device 240 may host training data, and entity analysis platform 220 may access the training data to train one or more neural networks for classification of entities as duplicates or non-duplicates.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
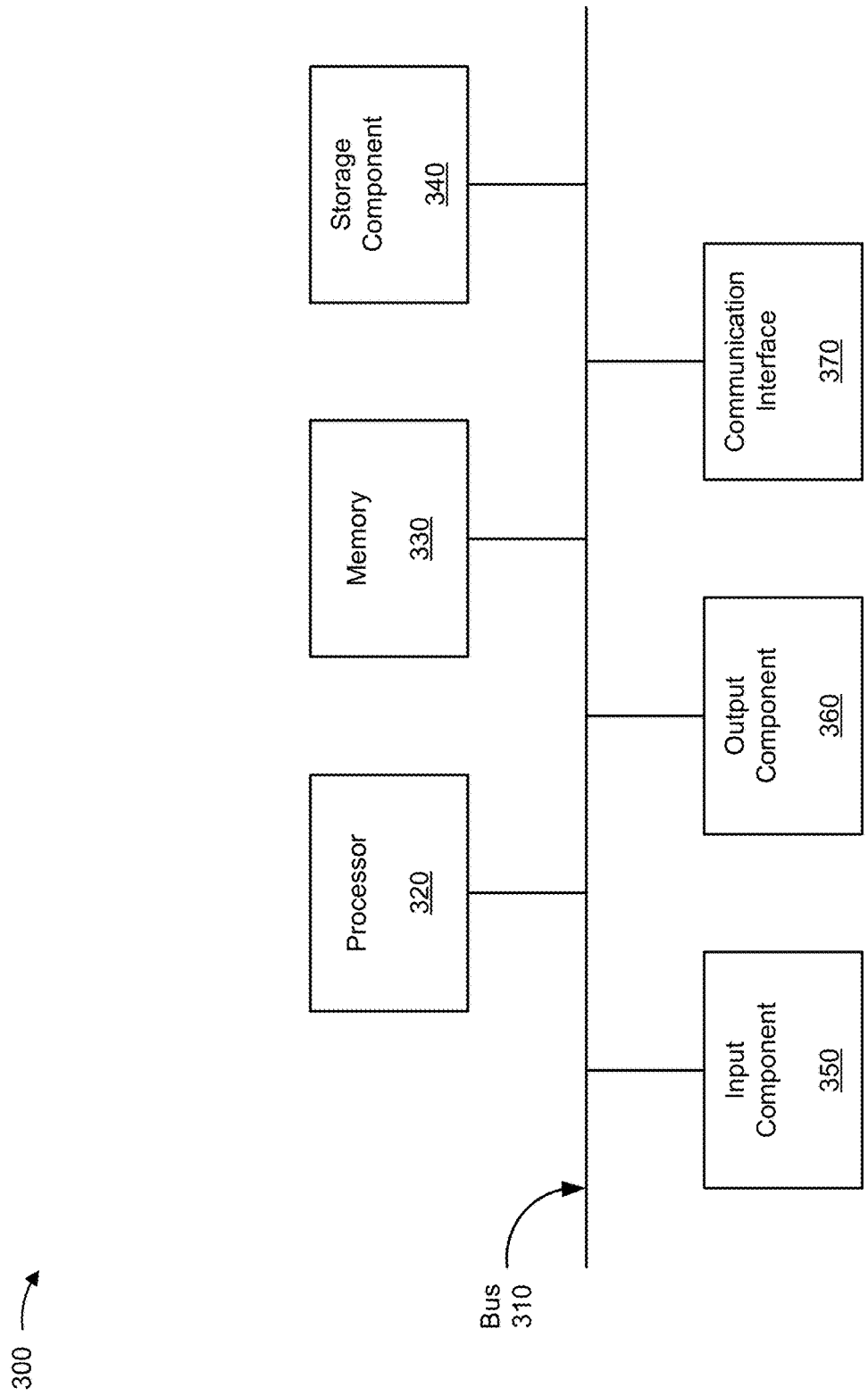
FIG. 3 is a diagram of example components of one or more devices of FIG. 2.

FIG. 3 is a diagram of example components of a device 300. Device 300 may correspond to client device 210, entity analysis platform 220, computing resource 222, and/or external device 240. In some implementations, client device 210, entity analysis platform 220, computing resource 222, and/or external device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
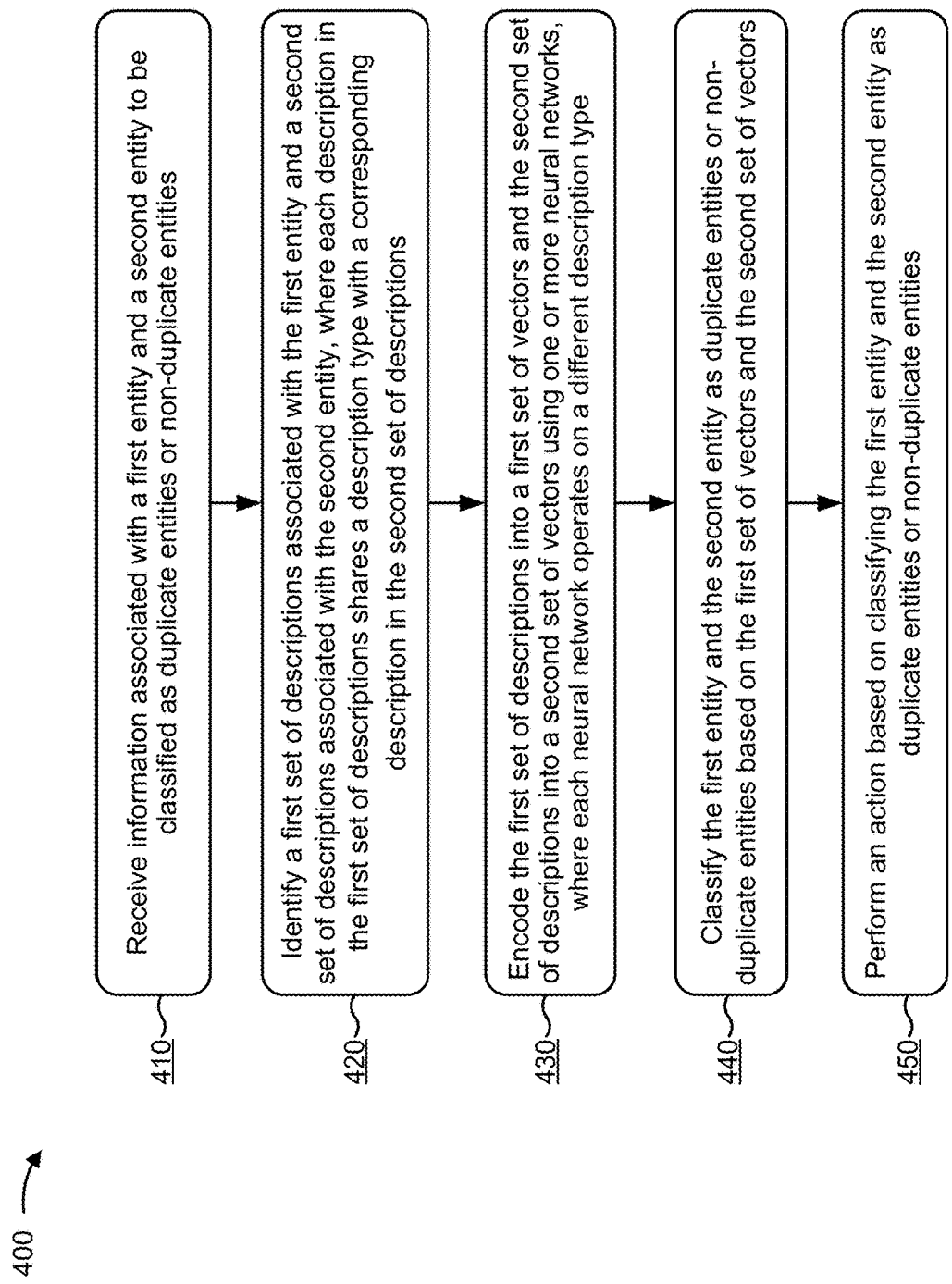
FIG. 4 is a flow chart of an example process for duplicate entity or similar entity detection and retrieval using neural networks.

FIG. 4 is a flow chart of an example process 400 for duplicate entity or similar entity detection and retrieval using neural networks. In some implementations, one or more process blocks of FIG. 4 may be performed by entity analysis platform 220. In some implementations, one or more process blocks of FIG. 4 may be performed by another device or a group of devices separate from or including entity analysis platform 220, such as client device 210, computing resource 222, and/or external device 240.

As shown in FIG. 4, process 400 may include receiving information associated with a first entity and a second entity to be classified as duplicate entities or non-duplicate entities (block 410). For example, entity analysis platform 220 may receive information associated with a first entity and a second entity to be classified as duplicate entities or non-duplicate entities. In some implementations, entity analysis platform 220 may receive the information from one or more client devices 210. For example, users may input bug reports using client device(s) 210, and the bug reports may be transmitted to entity analysis platform 220. In some implementations, entity analysis platform 220 may obtain the information from a repository of bug reports.

In some implementations, an entity may include text. In this case, entity analysis platform 220 may receive the text. Additionally, or alternatively, an entity may be a concept represented with text. In various implementations, an entity may include a bug report, a user review (e.g., a product review, a service review, etc.), a problem ticket, a customer complaint, a document, a claim (e.g., an insurance claim, a medical claim, etc.), and/or the like.

In some implementations, the first and second entities may be input to a model (e.g., a machine learning model), which may classify the entities as duplicate entities or non-duplicate entities. In this case, first and second entities may be classified as duplicate entities if the first and second entities share a degree of similarity that satisfies a threshold. For example, a first entity and a second entity may be classified as duplicate entities if first and second bug reports refer to a same bug or a similar bug, first and second product reviews are substantially the same or similar, first and second problem tickets refer to a same problem or a similar problem, and/or the like.

Similarly, first and second entities may be classified as non-duplicate entities if the first and second entities share a degree of similarity that does not satisfy a threshold (or share a degree of dissimilarity that satisfies a threshold). For example, a first entity and a second entity may be classified as non-duplicate entities if first and second bug reports refer to different bugs.

In some implementations, the model (e.g., the machine learning model) may be trained (e.g., using training data) before the entities are input to the model. For example, the model may be trained using training data that includes pairs of entities tagged with an indication, for each pair, of whether the pair of entities is a duplicate pair or a non-duplicate pair. In this case, the indications for each pair of entities may be generated based on user input and/or based on output from another machine learning model.

In some implementations, the training data may include earlier-received entities (e.g., bug reports) associated with a same project (e.g., a same software project) for which later-received entities are to be tested. This may increase the accuracy of the classification. In some implementations, the training data may include entities for a different project within a same domain (e.g., a different software project). In this way, the machine learning model may be applied regardless of whether a project has existing entities and/or existing training data.

As further shown in FIG. 4, process 400 may include identifying a first set of descriptions associated with the first entity and a second set of descriptions associated with the second entity, where each description in the first set of descriptions shares a description type with a corresponding description in the second set of descriptions (block 420). For example, entity analysis platform 220 may identify a first set of descriptions associated with the first entity and a second set of descriptions associated with the second entity. Each description in the first set of descriptions may share a description type with a corresponding description in the second set of descriptions. In some implementations, a description may include any text included in an entity.

In some implementations, a description in a set of descriptions may have a description type. A description type may include a long description, a short description, a structured data description, and/or the like. Where entity analysis platform 220 identifies more than one description associated with an entity, each description in a set of descriptions may have a description type that is the same as, or different from, any other description in the set of descriptions. In some implementations, a long description or short description may include unstructured data (e.g., information that does not follow a particular data format, such as free-form text, etc.). A short description may include text (e.g., free-form text) with a length that is less than (or less than or equal to) a threshold (e.g., a threshold quantity of, words, characters, lines, etc.). A long description may include text information with a length that is greater than (or greater than or equal to) a threshold.

In some implementations, a structured data description may include text that is formatted according to a particular data format (e.g., an XML format, a JSON format, etc.). Additionally, or alternatively, a structured data description may include one or more identifiers (e.g., tags, field identifiers, etc.) that categorize text. For example, an identifier may include a program identifier that identifies a program to which the bug report applies (e.g., a software program in which a bug is reported), a version identifier that indicates a version of the program to which the bug report applies, a severity identifier that indicates a severity of the bug identified in the bug report, a priority identifier that indicates a priority associated with resolving the bug, an environment identifier that indicates an environment in which the bug was reported (e.g., a software environment, a hardware environment, an operating system, a web browser, one or more applications executing when the bug occurred, etc.), a time identifier that indicates when the bug was reported, and/or the like.

In some implementations, entity analysis platform 220 may analyze the entity to identify one or more descriptions included in the entity. For example, entity analysis platform 220 may parse the entity to count a quantity of words, characters, etc. to determine whether a description is a short description or a long description. Additionally, or alternatively, entity analysis platform 220 may parse the entity to identify structured data (e.g., based on whether one or more field identifiers and/or tags are included in the entity).

In some implementations, entity analysis platform 220 may determine a first set of descriptions for the first entity and a second set of descriptions for the second entity. In this case, entity analysis platform 220 may modify the first set of descriptions and the second set of descriptions so that each description in the first set has a corresponding description in the second set that shares a same description type. For example, assume the first set of descriptions includes a structured data description, a long description, and a short description, and that the second set of descriptions includes a long description and a short description. In this case, entity analysis platform 220 may remove the structured data description from the first set so that a same machine learning model can be applied to the first set and the second set (e.g., using the long description and the short descriptions but not the structured data description). Alternatively, entity analysis platform 220 may use the structured data description, if available, to increase an accuracy of classification. For example, when a first set of descriptions includes a structured data description and a second set of descriptions does not include a structured data description, entity analysis platform 220 may apply a single-layer neural network to the first set of descriptions, and may not apply a single-layer neural network to the second set of descriptions.

In some implementations, different entities may have different descriptions, but different descriptions may share a description type. For example, a short description for a first bug report may be "Software crashed when I click Okay button" and a short description for a second bug report may be "Program halts execution when okay button pressed."

As further shown in FIG. 4, process 400 may include encoding the first set of descriptions into a first set of vectors and the second set of descriptions into a second set of vectors using one or more neural networks, where each neural network operates on a different description type (block 430). For example, entity analysis platform 220 may encode the first set of descriptions into a first set of vectors and the second set of descriptions into a second set of vectors using one or more neural networks. In some implementations, each neural network may operate on a different description type.

In some implementations, entity analysis platform 220 may encode a description by mapping a description to a vector (e.g., an array of numbers), and/or by mapping a high dimensional vector, that represents the description, to a low dimensional vector (e.g., a smaller array with fewer numbers) that represents the description.

For example, entity analysis platform 220 may process a description to create a high dimensional vector, and may input the high dimensional vector to a neural network. In this case, the neural network may process the high dimensional vector to encode the description to a low dimensional vector using dimensionality reduction (e.g., feature selection, feature extraction, etc.).

In some implementations, entity analysis platform 220 may process the description using a word embedding technique, such as a Global Vectors for Word Representation (GloVe) technique. In a word embedding technique, words in a word vector may be positioned in a vector space such that words that share a common context are positioned closer in proximity to one another within the vector space as compared to words that do not share a common context.

In some implementations, entity analysis platform 220 may identify a neural network, to be used for encoding a description, based on a description type of the description (e.g., a description type shared by a first entity in the first set and a second entity in the second set). For example, entity analysis platform 220 may identify a single-layer neural network for encoding structured data descriptions, may identify an LSTM neural network (or another type of recurrent neural network (RNN)) for encoding short descriptions, and may identify a convolutional neural network for encoding long descriptions. In some implementations, entity analysis platform 220 may identify multiple types of neural networks if the sets include multiple descriptions with shared description types.

A recurrent neural network (RNN) is a type of neural network where connections between units form a directed cycle. This creates an internal state of the RNN which allows the RNN to exhibit dynamic temporal behavior. An RNN can use internal memory to process arbitrary sequences of inputs. An LSTM neural network is a type of RNN that can remember a value for an arbitrary length of time. The LSTM neural network contains LSTM blocks that each contain gates that determine when an input value is significant enough to remember, when the LSTM neural network should continue to remember or forget the value, and when the LSTM neural network should output the value. A bidirectional RNN uses a finite sequence to predict or label each element of the sequence based on both the past and the future context of the element. This is done by concatenating the outputs of two RNNs, where one RNN processes the sequence from left to right, and the other RNN processes the sequence from right to left. The combined outputs are the predictions of given target signals. This technique has proved to be especially useful when combined with LSTM architecture (e.g., a bi-directional LSTM).

In a case where entity analysis platform 220 identifies an LSTM (e.g., for encoding short descriptions), entity analysis platform 220 may identify a bi-directional LSTM. In this case, a bi-directional LSTM may refer to an LSTM neural network that concurrently processes input in two directions (e.g., forward and backward). For example, the LSTM neural network may include three gates: an input gate (i), a forget gate (f), and an output gate (o). A gate may operate in accordance with the following formula:

$$g_{ti} = \sigma(W^g * x_{ti} + U^g * h_{t_{i-1}})$$

In this case, the variables $W^g$ and $U^g$ may represent parameters of the gate g, the variable $x_{ti}$ may represent the input vector (e.g., the high dimensional vector that represent a description), the variable $h_{t_{i-1}}$ may represent the hidden state of the gate at the previous time step (e.g., an output vector from a previous time step), and a may represent the sigmoid function.

Along with the hidden state, the LSTM module may also have a cell state. An update to the hidden state and cell state at any time step is controlled by the various gates as follows:

$$C_{ti} = f_{ti} * C_{t_{i-1}} + i_{ti} * \tanh(W^c * x_{ti} + U^c h_{t_{i-1}})$$

$$h_{ti} = o_{ti} * \tanh(C_{ti})$$

In this case, $C_{ti}$ may represent the cell state vector, $f_{ti}$ may represent the forget gate vector, $C_{t_{i-1}}$ may represent the cell state vector at the previous time step, $i_{ti}$ may represent the input gate vector, tan h may represent the hyperbolic tangent function, $W^c$ and $V^c$ may represent parameters of the model, $o_{ti}$ may represent the output gate vector, $x_{ti}$ may represent the input vector, and $h_{ti}$ may represent the output vector.

While a bi-directional LSTM is described above, entity analysis platform 220 may use another type of LSTM neural network and/or another type of recursive neural network for encoding a description, in some implementations.

In some implementations, entity analysis platform 220 may use a same neural network for descriptions in the first set and second set that share a description type. For example, an LSTM neural network selected for processing a first description from a first set and a second description from a second set may have the same number of neurons, the same weight on each neuron, the same connections between neurons, the same number and/or type of gates, and/or the like. Using a same neural network in this fashion may be referred to as using a Siamese model. A Siamese model may be defined as a model that uses identical sub-models. For example, a machine learning model may use identical neural networks for processing the first and second descriptions. In this way, entity analysis platform 220 improves consistency and accuracy of classification.

As further shown in FIG. 4, process 400 may include classifying the first entity and the second entity as duplicate entities or non-duplicate entities based on the first set of vectors and the second set of vectors (block 440). For example, entity analysis platform 220 may classify the first entity and the second entity as duplicate entities or non-duplicate entities based on the first set of vectors and the second set of vectors. In some implementations, entity analysis platform 220 may classify the first and second entities by making a determination and/or storing an indication of whether the first and second entities are duplicate entities or non-duplicate entities. For example, entity analysis platform 220 may use vectors (e.g., as described above) to classify the entities (e.g., by comparing a similarity of one or more corresponding vectors).

In some implementations, in a case where entity analysis platform 220 uses multiple neural networks, multiple vectors (e.g., low dimensional vectors) may be output for an entity. In this case, entity analysis platform 220 may combine the multiple vectors to generate an overall vector for the entity. For example, entity analysis platform 220 may combine the multiple vectors using vector concatenation. In this case, entity analysis platform 220 may then compare the overall vectors to classify the entities. For example, entity analysis platform 220 may concatenate a structured data description vector output from the single-layer neural network, a short description vector output from the bi-LSTM neural network, and/or a long description vector output from the convolutional neural network.

In some implementations, entity analysis platform 220 may train the model using a maximum margin training loss objective, such as according to the following equation:

$$\mathrm{Max}\{0, M - \mathrm{Cosine}(F_b, F_{b+}) + \mathrm{Cosine}(F_b, F_{b-})\}$$

In this case, M may represent a hyper-parameter used for classification (e.g., and may be set to one), $F_b$ may refer to a vector representing bug b (e.g., a concatenation of multiple vectors, such as a structured data description vector, a short description vector, a long description vector, and/or the like), $F_{b+}$ may refer to a vector representing a bug b+ that is a duplicate of bug b, and $F_{b-}$ may refer to a vector representing a bug b− that is a non-duplicate of bug b. This training may result in a model that classifies two entities as duplicate entities if corresponding parameters of entity vectors satisfy a condition (e.g., a difference between the parameters is less than a threshold). Similarly, the model may classify two entities as non-duplicate entities if corresponding parameters of entity vectors do not satisfy the condition (e.g., a difference between the parameters is greater than a threshold).

As an example, the classifier may map vectors to a vector space, and may compare an angle between the vectors (e.g., a cosine similarity) mapped to the vector space (e.g., an angle using an origin as a reference). In this case, if the angle is less than or equal to the threshold, the classifier may classify the entities as duplicate entities. Similarly, if the angle is greater than the threshold, the classifier may classify the entities as non-duplicate entities. Once entities are classified, such classification may be used to retrieve duplicate (e.g., similar) entities based on the consume similarity between vectors associated with the entities. For example, a first entity may be provided as input to entity analysis platform 220. Entity analysis platform 220 may encode a first vector for the first entity, and may calculate cosine similarities between the first vector and other vectors associated with other entities. If the first vector and a second vector have a cosine similarity that satisfies the threshold, then entity analysis platform 220 may output information that identifies the second entity to indicate that the first and second entities are duplicate (e.g., similar) entities. In some implementations, entity analysis platform 220 may output a list of entities that have a cosine similarity with the first vector, such as a list of K entities (where K is configurable), a list of entities for which the cosine similarity satisfies a threshold, or the like.

In this way, the entity analysis platform 220 may employ machine learning to perform duplicate bug report detection regardless of whether the bug reports are formatted according to a particular structured data format. Furthermore, because different types of neural networks may be better suited to process different kinds of data, employing different types of neural networks to process different types of descriptions may thereby improve the accuracy of duplicate bug report detection.

As further shown in FIG. 4, process 400 may include performing an action based on classifying the first entity and the second entity as duplicate entities or non-duplicate entities (block 450). For example, entity analysis platform 220 may perform an action based on classifying the first entity and the second entity as duplicate entities or non-duplicate entities. In some implementations, entity analysis platform 220 may output an indication of whether the entities are duplicate or non-duplicate entities. For example, entity analysis platform 220 may provide the indication to client device 210, which may provide the indication for display. In some implementations, a pair of entities (e.g., bug reports) may be input (e.g., from client device 210), and the indication may indicate whether the pair of entities is a duplicate or non-duplicate pair of entities. In some implementations, a single entity may be input, and entity analysis platform 220 may generate a list of N entities that are most similar to the input entity (e.g., where N is configurable). Additionally, or alternatively, entity analysis platform 220 may generate a similarity score that indicates a degree of similarity between entities, and may output the similarity score.

In some implementations, entity analysis platform 220 may receive a large number of bug reports (e.g., tens, hundreds, thousands, etc.), and may generate a list with a smaller number of bugs to be resolved based on eliminating duplicate bugs represented by duplicate bug reports. Additionally, or alternatively, entity analysis platform 220 may analyze duplicate bug reports using natural language processing to identify the bug report that best articulates the bug, and may include the identified bug report in the list while excluding duplicate bug reports from the list. Where other types of entities are classified, similar concepts may be applied. For example, entity analysis platform 220 may identify only the most articulate user review of a set of similar user reviews, and/or the like.

In some implementations, entity analysis platform 220 may automatically mark similar bug reports as resolved. For example, if a first bug report is marked as resolved, entity analysis platform 220 may mark all bug reports that are duplicates of the first bug report as resolved (e.g., if the duplicate bug reports are generated and/or analyzed in a same time frame as the first bug report). In some cases, entity analysis platform 220 may automatically email or contact users(s) that created the duplicate bug reports to notify the user(s) that a corresponding bug has been resolved. Additionally, or alternatively, entity analysis platform 220 may delete one or more duplicate bug reports from memory, thereby conserving memory space.

In some implementations, entity analysis platform 220 may prioritize bugs for resolution. For example, entity analysis platform 220 may prioritize bugs with the most duplicates (e.g., because a large number of users are affected by such bugs, as may be indicated by the large number of duplicate reports). Additionally, or alternatively, entity analysis platform 220 may attempt to automatically resolve the bugs in the prioritized list (e.g., by identifying a solution to a similar bug).

In some implementations, entity analysis platform 220 may store and/or provide information regarding a solution that was applied to resolve a bug. In this way, a bug report may be input to entity analysis platform 220, and entity analysis platform 220 may output information regarding solution(s) for one or more bugs associated with bug reports that are similar to the input bug report. Additionally, or alternatively, entity analysis platform 220 may store a tester identifier that identifies a tester assigned to the resolved bugs and/or may store contact information for the tester, and may assign a newly input bug to a same tester that resolved a similar bug in the past (e.g., by emailing or otherwise contacting the tester using the contact information, but sending a bug report to software used by the tester, or the like).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
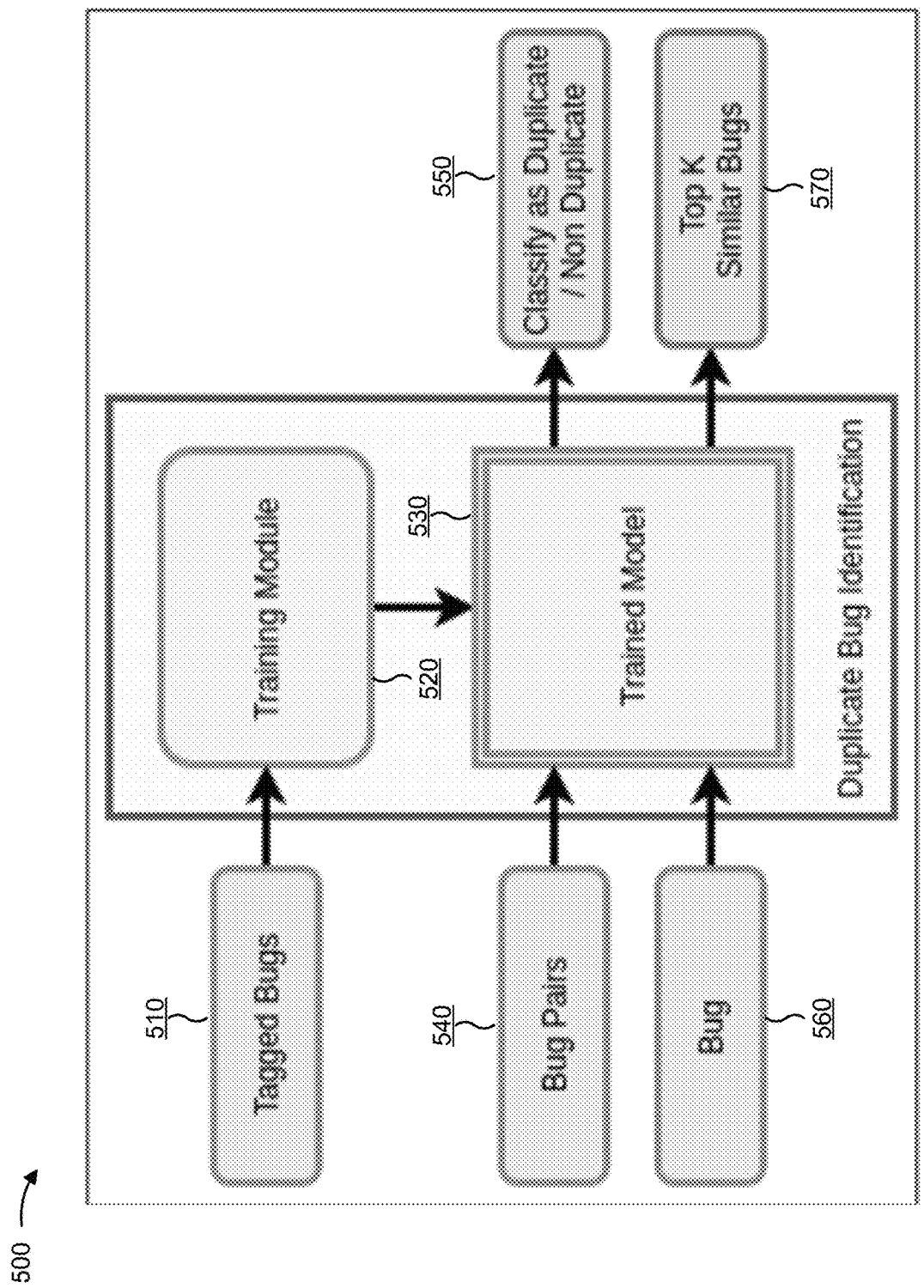
FIG. 5 is a diagram of an example implementation relating to the example process shown in FIG. 4.

FIG. 5 is a diagram of an example implementation 500 relating to example process 400 shown in FIG. 4. FIG. 5 shows an example of duplicate entity detection using neural networks.

As described above, a machine learning model may be trained before entities, such as bug reports, are input into the model. As shown in FIG. 5, and as shown by reference number 510, tagged bugs may be provided to a training module (shown by reference number 520). For example, the tagged bugs may include pairs of bug reports, each tagged with an indication of whether the pair is a duplicate pair or a non-duplicate pair.

As shown by reference number 530, results of the training performed by the training module may be provided to generate or improve a trained model (shown by reference number 530). The trained model may employ one or more neural networks, such as a single-layer neural network, a bi-LSTM, and/or a CNN, as described above.

As shown by reference number 540, bug pairs (e.g., pairs of bug reports) may be provided to the trained model. As shown by reference number 550, the trained model may classify the bug pairs as duplicate bug reports or non-duplicate bug reports. For example, the trained model may encode descriptions from the bug reports to generate vectors used to determine how the bug pairs should be classified. In this case, the trained model may utilize different types of neural networks to process different types of descriptions.

As shown by reference number 560, an individual bug (e.g., a single bug report) may be provided to the trained model. As shown by reference number 570, the trained model may generate a list of bugs (e.g., the top K bugs), such as a configurable number (e.g., K) bugs, that are most similar to the individual bug.

As indicated above, FIG. 5 is provided as an example. Other examples are possible and may differ from what was described with regard to FIG. 5.

Implementations described herein use machine learning to perform duplicate bug report detection regardless of whether the bug reports are formatted according to a particular structured data format. For example, these implementations may use natural language processing and/or word embedding techniques to process free-form text, and may operate on the free-form text to perform duplicate bug report detection. In this way, implementations described herein may be used without formatting bug reports, thereby conserving resources (e.g., computing resources, time, and money) that would otherwise be used to format bug reports in a particular manner, and also increasing the applicability of duplicate bug report detection to a greater number of scenarios (e.g., more software projects).

Furthermore, implementations described herein may configure a machine learning model for duplicate bug report detection based on a type of description associated with the bug report. For example, a first neural network may be used to process short descriptions included in bug reports, a second neural network may be used to process long descriptions included in bug reports, a third neural network may be used to process structured data descriptions included in bug reports, and/or the like. Because different types of neural networks may be better suited to process different description types, using different types of neural networks in this way may thereby improve the accuracy of duplicate bug report detection.

Finally, implementations described herein may permit training of a machine learning model to be applied to a first project using training data from a second project (e.g., in a same domain as the first project). In this way, the machine learning model may be applied to a project even if training data for that project is limited or does not exist, thereby increasing the applicability of duplicate bug report detection to a greater number of projects.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more hardware processors to:
        receive information associated with a first bug report and a second bug report to be classified as duplicate bug reports or non-duplicate bug reports;
        identify a first description, associated with the first bug report, and a second description associated with the second bug report,
            the first description and the second description being different descriptions having a shared description type;
        identify a neural network, of a plurality of different types of neural networks, for encoding the first description and the second description, based on the shared description type;
        encode the first description into a first vector using the neural network;
        encode the second description into a second vector using the neural network;
        classify the first bug report and the second bug report as duplicate bug reports or non-duplicate bug reports based on the first vector and the second vector; and
        perform an action based on classifying the first bug report and the second bug report as duplicate bug reports or non-duplicate bug reports.

2. The device of claim 1, where the one or more hardware processors, when performing the action, are to:
    retrieve one or more bug reports that share a threshold degree of similarity with the first bug report or the second bug report; and
    output information associated with the one or more bug reports.

3. The device of claim 1, where the shared description type is an unstructured data type; and
    where the one or more hardware processors, when identifying the neural network, are to:
        identify the neural network based on the shared description type being the unstructured data type.

4. The device of claim 1, where the shared description type is a short description type indicating a description length less than or equal to a threshold length; and
    where the one or more hardware processors, when identifying the neural network, are to:
        identify a bi-directional long short-term memory neural network based on the shared description type being the short description type.

5. The device of claim 1, where the shared description type is a long description type indicating a description length greater than or equal to a threshold length; and
    where the one or more hardware processors, when identifying the neural network, are to:
        identify a convolutional neural network based on the shared description type being the long description type.

6. The device of claim 1, where the shared description type is a structured description type; and
    where the one or more hardware processors, when identifying the neural network, are to:
        identify a single-layer neural network based on the shared description type being the structured description type.

7. The device of claim 1, where the one or more hardware processors, when classifying the first bug report and the second bug report, are to:
    classify the first bug report and the second bug report as duplicate bug reports; and
    where the one or more hardware processors, when performing the action, are to:
        determine that the first bug report has been resolved; and
        mark the second bug report as resolved based on determining that the first bug report has been resolved and classifying the first bug report and the second bug report as duplicate bug reports.

8. A method, comprising:
    receiving, by a device, information associated with a first entity and a second entity to be classified as duplicate entities or non-duplicate entities;
    identifying, by the device, a first set of descriptions, associated with the first entity, and a second set of descriptions associated with the second entity,
        each description, included in the first set of descriptions, sharing a description type with a corresponding description included in the second set of descriptions;
    encoding, by the device, the first set of description into a first set of vectors using a corresponding set of neural networks,
        each neural network, of the corresponding set of neural networks, operating on a different description type;
    encoding, by the device, the second set of descriptions into a second set of vectors using the corresponding set of neural networks;
    classifying, by the device, the first entity and the second entity as duplicate entities or non-duplicate entities based on the first set of vectors and the second set of vectors; and performing, by the device, an action based on classifying the first entity and the second entity as duplicate entities or non-duplicate entities.

9. The method of claim 8, where a first description, included in the first set of descriptions, and a second description, included in the second set of descriptions, share a short description type indicating a description length less than or equal to a threshold length;
where encoding the first set of descriptions comprises:
encoding the first description using a bi-directional long short-term memory neural network based on the first description and the second description sharing the short description type; and
where encoding the second set of descriptions comprises:
encoding the second description using the bi-directional long short-term memory neural network based on the first description and the second description sharing the short description type.

10. The method of claim 8, where a first description, included in the first set of descriptions, and a second description, included in the second set of descriptions, share a long description type indicating a description length greater than or equal to a threshold length;
where encoding the first set of descriptions comprises:
encoding the first description using a convolutional neural network based on the first description and the second description sharing the long description type; and
where encoding the second set of descriptions comprises:
encoding the second description using the convolutional neural network based on the first description and the second description sharing the long description type.

11. The method of claim 8, where a first description, included in the first set of descriptions, and a second description, included in the second set of descriptions, share a structured description type;
where encoding the first set of descriptions comprises:
encoding the first description using a single-layer neural network based on the first description and the second description sharing the structured description type; and
where encoding the second set of descriptions comprises:
encoding the second description using the single-layer neural network based on the first description and the second description sharing the structured description type.

12. The method of claim 8, where the first set of descriptions includes a first description that shares a first description type with a second description included in the second set of descriptions;
where the first set of descriptions includes a third description that shares a second description type with a fourth description included in the second set of descriptions; and
where encoding the first set of descriptions and the second set of descriptions comprises:
encoding the first description and the second description using a first neural network that corresponds to the first description type; and
encoding the third description and the fourth description using a second neural network that corresponds to the second description type.

13. The method of claim 8, where performing the action comprises:
outputting an indication of whether the first entity and the second entity are duplicate entities or non-duplicate entities.

14. The method of claim 8, where the first entity includes a first bug report and the second entity includes a second bug report; and
where classifying the first entity and the second entity as duplicate entities or non-duplicate entities comprises:
classifying the first bug report and the second bug report as duplicate bug reports or non-duplicate bug reports.

15. A non-transitory computer-readable medium storing instructions, the instructions comprising:
one or more instructions that, when executed by one or more processors, cause the one or more processors to:
receive information associated with a first entity and a second entity to be classified as duplicate entities or non-duplicate entities;
identify a first description associated with the first entity and a second description associated with the second entity,
the first description and the second description having a first description type;
identify a third description associated with the first entity and a fourth description associated with the second entity,
the third description and the fourth description having a second description type that is different from the first description type,
the third description being different from the first description, and
the fourth description being different from the second description;
encode the first description into a first vector using a first neural network;
encode the second description into a second vector using the first neural network;
encode the third description into a third vector using a second neural network;
encode the fourth description into a fourth vector using the second neural network;
classify the first entity and the second entity as duplicate entities or non-duplicate entities based on the first vector, the second vector, the third vector, and the fourth vector; and
perform an action based on classifying the first entity and the second entity as duplicate entities or non-duplicate entities.

16. The non-transitory computer-readable medium of claim 15, where the first description type is a short description type indicating a description length less than or equal to a threshold length;
where the one or more instructions, that cause the one or more processors to encode the first description and to encode the second description, cause the one or more processors to:
encode the first description and the second description using a bi-directional long short-term memory neural network based on the first description type being the short description type.

17. The non-transitory computer-readable medium of claim 15, where the first description type is a long description type indicating a description length greater than or equal to a threshold length;

where the one or more instructions, that cause the one or more processors to encode the first description and to encode the second description, cause the one or more processors to:
encode the first description and the second description using a convolutional neural network based on the first description type being the long description type.

18. The non-transitory computer-readable medium of claim 15, where the one or more instructions, that cause the one or more processors to perform the action, cause the one or more processors to:
generate a list of duplicate entities or non-duplicate entities.

19. The non-transitory computer-readable medium of claim 18, where the one or more instructions, that cause the one or more processors to perform the action, cause the one or more processors to:
prioritize the list based on a quantity of duplicate entities.

20. The non-transitory computer-readable medium of claim 15, where the one or more instructions, that cause the one or more processors to perform the action, cause the one or more processors to:
retrieve one or more bug reports that share a threshold degree of similarity with the first entity or the second entity; and
output information associated with the one or more bug reports.

* * * * *